United States Patent [19]

Mills, Jr. et al.

[11] Patent Number: 4,910,397

[45] Date of Patent: Mar. 20, 1990

[54] PULSED NEUTRON POROSITY LOGGING

[75] Inventors: William R. Mills, Jr., Duncanville; David C. Stromswold, Addison, both of Tex.

[73] Assignee: Mobil Oil Corporation, New York, N.Y.

[21] Appl. No.: 295,619

[22] Filed: Jan. 10, 1989

[51] Int. Cl.$^4$ .............................................. G01V 5/10
[52] U.S. Cl. .................. 250/264; 250/266; 250/269
[58] Field of Search .............. 250/264, 265, 266, 269, 250/262

[56] References Cited

U.S. PATENT DOCUMENTS

| | | | |
|---|---|---|---|
| 3,800,150 | 3/1974 | Givens | 250/262 |
| 4,097,737 | 6/1978 | Mills, Jr. | 250/269 |
| 4,241,253 | 12/1980 | Allen et al. | 250/392 |
| 4,266,126 | 5/1981 | Mills, Jr. | 250/264 |
| 4,283,624 | 11/1981 | Mills, Jr. | 250/264 |
| 4,302,669 | 11/1981 | Allen et al. | 250/264 |
| 4,556,793 | 12/1985 | Allen et al. | 250/269 |
| 4,581,532 | 4/1986 | Givens et al. | 250/266 |
| 4,590,370 | 5/1986 | Mills, Jr. et al. | 250/269 |
| 4,625,110 | 11/1986 | Smith, Jr. | 250/262 |
| 4,638,161 | 1/1987 | Smith, Jr. et al. | 250/269 |
| 4,692,617 | 9/1987 | Allen et al. | 250/269 |

OTHER PUBLICATIONS

Determination of Lithology and Porosity, chapter 12, pp. 69-75.

Primary Examiner—Carolyn E. Fields
Attorney, Agent, or Firm—Alexander J. McKillop; Charles J. Speciale; George W. Hager, Jr.

[57] ABSTRACT

A borehole logging tool employing a pulsed neutron source and a pair of spaced-apart epithermal neutron detectors is lowered into a borehole traversing a subsurface formation. The formation is irradiated with bursts of fast neutrons and the epithermal neutrons returning to the borehole as a result of such irradiation are detected by the pair of epithermal neutron detectors. These detected epithermal neutrons are both time resolved and time integrated during their epithermal die-away spectrum to provide indications of lithology independent porosity and lithology dependent porosity respectively.

7 Claims, 4 Drawing Sheets

PULSED NEUTRON POROSITY LOGGING

BACKGROUND OF THE INVENTION

This invention relates to pulsed neutron porosity logging and more particularly to a well logging process for irradiating subterranean formations under investigation with bursts of fast neutrons and characterizing the formation on the basis of the subsequently produced epithermal neutron population.

Various techniques may be employed in order to characterize subterranean formations with regard to their fluid or mineral content, lithologic characteristics, porosity, or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal or epithermal neutrons employing two detectors at different spacings from the source or by measuring epithermal neutrons with a single detector.

In pulsed neutron porosity logging procedures, the formations are irradiated with repetitive bursts of fast neutrons, normally neutrons exhibiting an energy greater than 1 Mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutrons is acquired as kinetic energy by the nucleus with which it collides. The remaining energy loss generally takes the form of a gamma ray emitted from the collision nucleus. In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary, it is normally placed in the range of 0.1-1 electron volt.

The populations of neutrons at the various energy levels decay with time following primary irradiation and thus offer means of characterizing the formation. For example, in the case of elastic scattering, which predominates for energies between a few ev and about 1 Mev, the number of collisions required for a neutron to moderate from one energy level to a second lower energy level varies more or less directly with the automatic weight of the nuclei available for collision. In subterranean formations, hydrogen nuclei present in the hydrogenous materials such as oil, water, and gas tend to predominate in the slowing down process. Thus the rate of decay, or die-away rate, of the epithermal neutron population gives a qualitative indication of the amount of hydrogenous material present which in turn may be indicative of the porosity of the formation. U.S. Pat. No. 4,097,737 to Mills discloses a pulsed neutron porosity logging system for measuring epithermal neutron die-away utilizing a 14-Mev pulsed neutron source and a neutron detector that is sensitive to epithermal neutrons and highly discriminatory against thermal neutrons.

SUMMARY OF THE INVENTION

The present invention is directed to pulsed neutron porosity logging of subsurface formations and more particularly to characterizing a subsurface formation as to porosity and lithology based on the nature of the die-away spectra of epithermal neutrons within the formation.

A subsurface formation is repetitively irradiated with bursts of fast neutrons spaced apart in time. Firstly, the die-away rate of epithermal neutrons within the irradiated formation is measured from the die-away spectrum of the epithermal neutrons. A measure of subsurface formation porosity which is largely independent of lithology is determined from the measured die-away rate of epithermal neutrons. Secondly, a total count of epithermal neutrons within the irradiated formation is measured during the die-away spectrum of the epithermal neutrons. A lithology dependent measure of subsurface formation porosity is determined from the measured count of epithermal neutrons. In one aspect, the die-away rate of epithermal neutrons is measured by time resolving epithermal neutrons during the die-away spectrum. In another aspect, the count of epithermal neutrons is measured by time integrating epithermal neutrons during the die-away spectrum.

In a yet further aspect, the lithology independent and dependent measurements of porosity are combined to provide an indication of formation lithology inf accordance with a known relationship between the lithology independent and dependent measurements of porosity for the known formation.

In a still further aspect, a subsurface formation penetrated by a borehole is logged with a borehole logging tool employing a pulsed source of fast neutrons and a pair of spaced-apart neutron detectors. The formation is irradiated with bursts of fast neutrons spaced-apart in time from the neutron source. Epithermal neutrons returning to the borehole as a result of the irradiation of the formation with fast neutrons are detected by the pair of neutron detectors. The epithermal neutrons detected by at least one of the neutron detectors are time resolved during the die-away spectrum of such epithermal neutrons to provide the measure of a lithology independent porosity. The epithermal neutrons detected by both of the neutron detectors are time integrated during the die-away spectrum of such epithermal neutrons to provide the measure of a lithology dependent porosity.

DESCRIPTION OF THE PREFERRED EMBODIMENT

Figure 1:
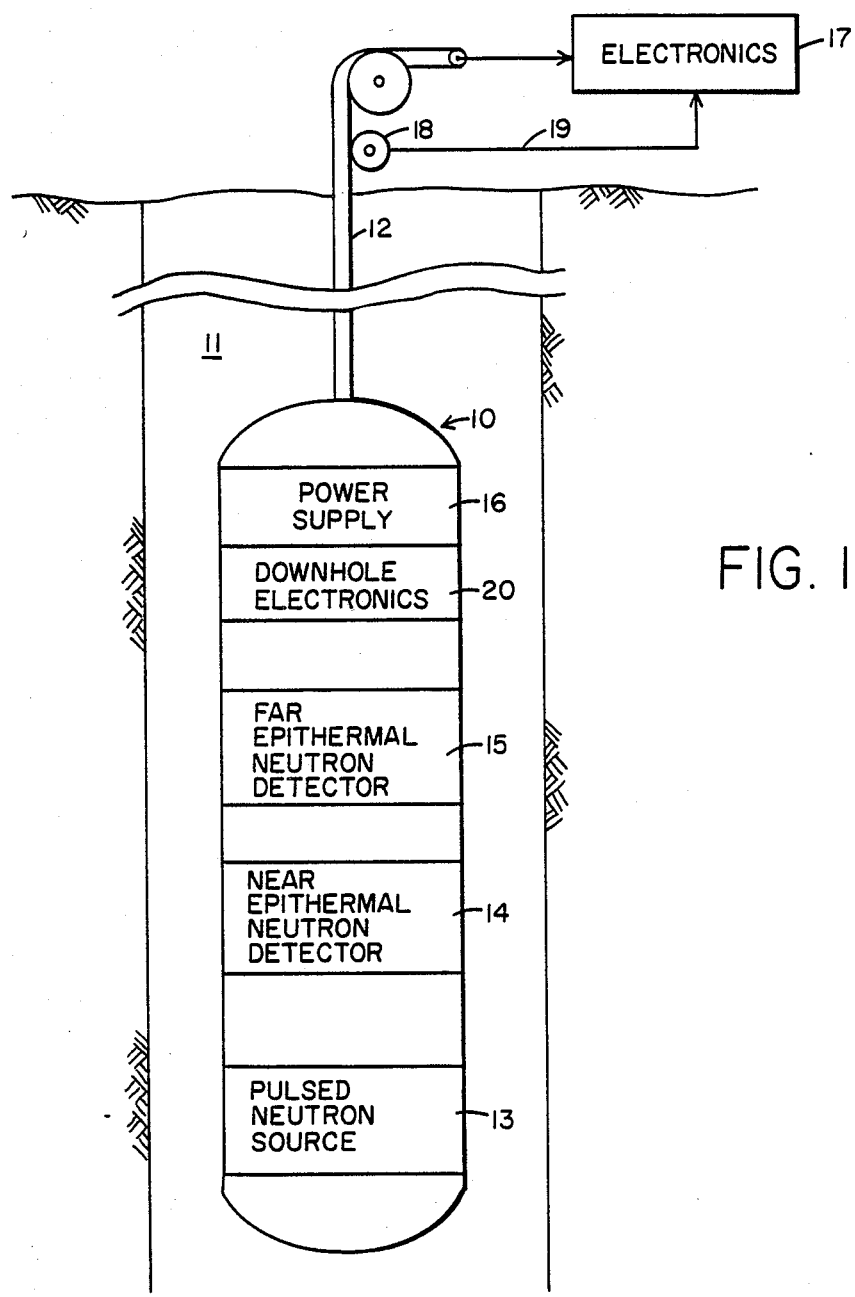
FIG. 1 illustrates a dual-detector, pulsed neutron logging tool useful in carrying out the pulsed neutron porosity logging method of the present invention.

Referring to FIG. 1, there will firstly be described a borehole logging tool with which the pulsed neutron porosity logging method of the present invention may be carried out. A borehole logging tool 10 is supported within the borehole 11 by cable 12. Housed within tool 10 near its lower end is a high energy pulsed neutron source 13. Located at spaced-apart positions above pulsed neutron source 13 are a near epithermal neutron detector 14, a far epithermal neutron detector 15, a power supply 16, and a downhole electronics section 20. Cable 12 carries information and control signals to an uphole electronics section 17 for processing and recording. As the tool 10 is moved through the borehole 11, a depth recording means such as a measuring sheave 18 produces a depth signal which is applied to uphole electronics section 17 by way of line 19 thus correlating the downhole measurements with the depths at which they were taken.

Neutron source 13 may be any suitable pulsed fast neutron source but preferably will take the form of a D-T accelerator comprising an ion source of deuterium and a target of tritium. Trigger pulses are periodically applied to the deuterium source in order to ionize the deuterium. The deuterium ions thus produced are accelerated to the target by a high negative voltage and the resulting reaction between the deuterium ions and the tritium produces bursts of neutrons having an energy of about 14 Mev. The neutron bursts will be of a duration of about 1 to 20 microseconds with an interval between bursts of about 50 to 200 microseconds to provide a pulse repetition rate of 5,000 to 20,000 fast neutron bursts per second. One such acceptable neutron source is manufactured by Gearhart Industries of Fort Worth, Tex.

Epithermal neutron detectors 14 and 15 may be of any suitable type which optimizes the detection of epithermal neutrons with minimized thermal neutron effects. A preferable detector comprises one or more helium-3 counters covered or wrapped by a thermal neutron shielding material, such as gadolinium or cadmium, to absorb thermal neutrons while letting most of the epithermal neutrons reach the counters. Epithermal neutrons are those neutrons which exhibit energies within the range of immediately above the thermal equilibrium region to about an energy of 100 electron volts. While the boundary between epithermal and thermal neutrons is somewhat arbitrary, it is normally placed in the range of 0.1 to 1.0 electron volt. Thus, the thermal neutron shielding allows primarily epithermal neutrons above 0.1 to 1.0 electron volt to reach the neutron counter. Several such epithermal neutron detectors are described more fully in U.S. Pat. Nos. 4,097,737 to Mills; 4,241,253 to Allen, Givens and Mills; 4,556,793 to Allen and Mills; and 4,590,370 to Mills and Allen, the teachings of which are incorporated herein by reference.

While the logging tool 10 is shown in FIG. 1 centralized within the borehole 11, it will be apparent that borehole fluid epithermal neutrons will interfere with the detection of formation epithermal neutrons. To minimize the effect of such borehole fluid epithermal neutrons the epithermal neutron detectors 14 and 15 may be positioned against the borehole wall by either positioning the logging tool against the borehole wall or locating the detectors in a separate housing or pad which may be positioned against the borehole wall. Such a positioning of the detectors against the borehole wall is more fully described in U.S. Pat. No. 4,581,532 to Givens and Mills, the teaching of which is incorporated herein by reference.

The power supply 16 is provided for the pulsed neutron source 13 and the downhole electronics 20. Acceptable power supplies suitable for use with a D-T pulsed neutron source are described in U.S. Pat. Nos. 3,719,827; 3,984,694; and 4,298,825 to Dennis.

Having described the pulsed neutron borehole logging tool of FIG. 1 which may be used in practicing the present invention, such invention will now be described as it relates to the characterization of the porosity and lithology of a subsurface formation. A problem arises during such a characterization when the rock matrix is more complex than consisting of a single known mineral. The present invention is therefore directed to a pulsed neutron porosity logging method which characterizes formation porosity as to both a lithology independent and a lithology dependent component and to the use of such components in identifying unknown or complex formation lithology.

Figure 2:
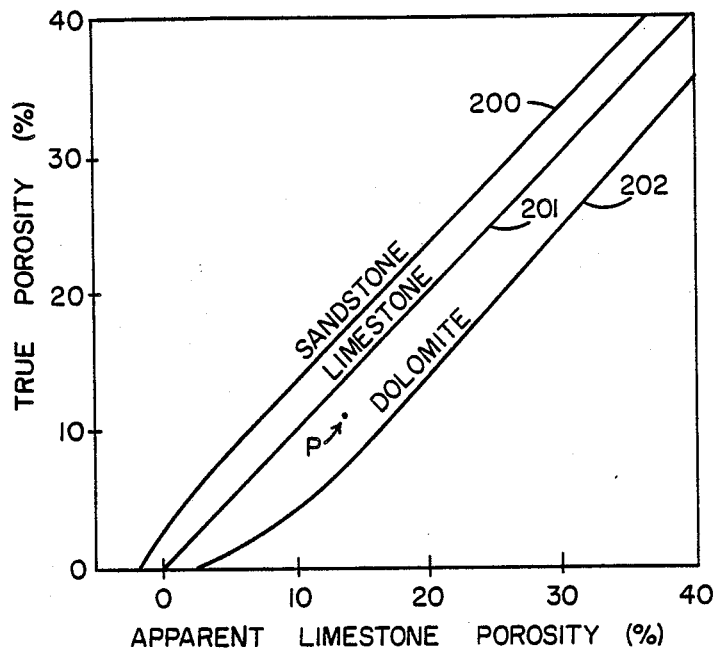
FIGS. 2 and 3 illustrate neutron porosity curves for various formation lithologies.

Referring now to FIG. 2, there is shown the effect which a complex lithology can have on formation porosity measurements. FIG. 2 is a graph showing neutron porosity equivalence curves as generally used in the interpretation of dual detector compensated neutron logs in current use. Apparent porosity is conventionally plotted along the abscissa and true porosity is conventionally plotted along the ordinate. A conventional compensated neutron log is obtained by the use of a steady-state source of high energy neutrons and two thermal neutron detectors. The rock matrix seriously interferes with the effect due to hydrogen contained in fluid that occupies the pore volume in the matrix. The presence of oxygen, silicon, calcium or carbon in the matrix renders compensated neutron porosity logging methods less sensitive to porosity alone than is desirable. Further, it is customary to calibrate the logging tool in a known formation, such as limestone. A logging tool thus calibrated when moved through formations where the lithology differs from that of limestone leads to erroneous results in terms of formation porosity.

In FIG. 2, curve 200 represents the relationship between apparent and true porosity for sandstone. Curve 201 represents the relationship between apparent and true porosity for limestone and curve 202 for dolomite. It will be noted that only the limestone curve 201 is linear. This is because calibration for the compensated neutron log is carried out in limestone. Consequently, it can be seen that to interpret the compensated neutron log accurately in terms of true porosity, the nature of composition of the rock matrix must be known. Conversely, if an independent measure of true porosity is coupled with apparent porosity from a compensated neutron log, a point P will be defined on the graph lying between two of the curves 200–202 such as limestone and dolomite for example. By inversely proportioning the distance of the point P between the two curves, the percentage compositions of limestone and dolomite can be determined.

Figure 3:
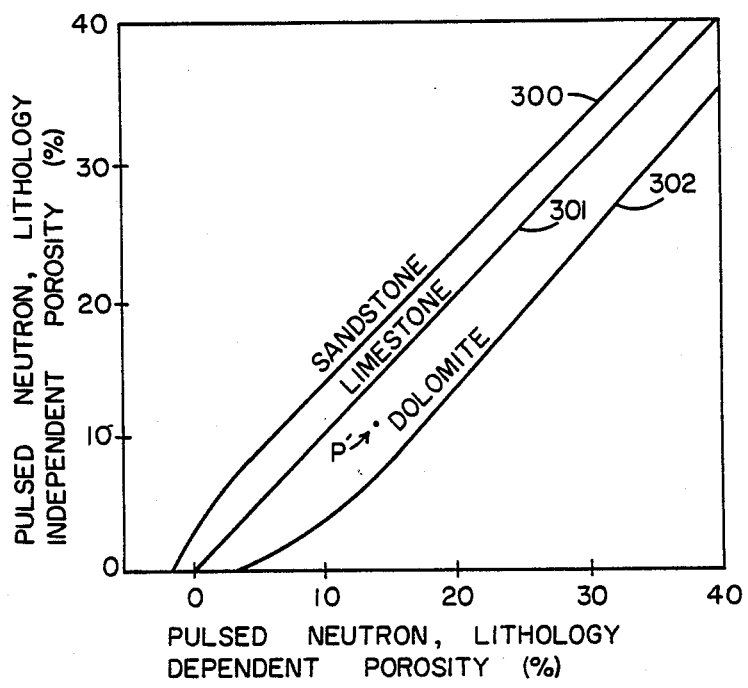

In contrast with the foregoing, the present invention is directed to a pulsed neutron porosity logging method for obtaining lithology independent and dependent porosity measurements which will be used in lieu of independent porosity and compensated neutron logging measurements. The present invention utilizes the nature of the die-away spectrum of epithermal neutrons within the formation resulting from irradiation with repetitive bursts of fast neutrons to characterize the formation as to its porosity and its lithology. More particularly the pulsed neutron source 13 of FIG. 1 repetitively irradiates the formation surrounding borehole 11 with bursts of fast neutrons. The epithermal neutrons resulting within the formation are detected by both epithermal neutron detectors 14 and 15. Firstly, the die-away rate of the detected epithermal neutrons is measured during their die-away spectrum by time resolving such epithermal neutrons to provide a lithology independent measure of formation porosity. Secondly, a total count of detected epithermal neutrons is taken during the die-away spectrum by time integrating such epithermal neutrons to provide a lithology dependent measure of formation porosity. By cross plotting such lithology independent and dependent pulsed neutron porosity measurements as shown in FIG. 3 in similar manner to that of FIG. 2 a point P' can be identified on FIG. 3 which likewise characterizes the formation's lithology through the inverse proportioning of the distance of point P' between the limestone curve 301 and the dolomite curve 302 for a limestone calibrated logging tool.

Figure 4:
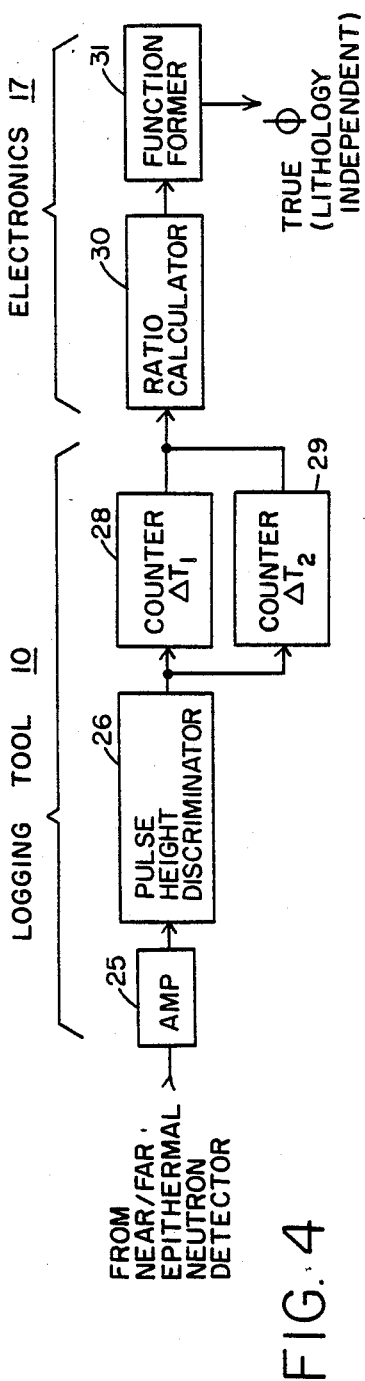
FIGS. 4 and 5 are electrical schematics of circuitry used with the pulsed neutron logging tool of FIG. 1 for carrying out the pulsed neutron porosity logging method of the present invention.

Referring initially to the epithermal die-away rate measurement, this measurement is carried out by time resolving the epithermal neutrons detected by at least one of the epithermal neutron detectors 14 and 15. This time resolution is accomplished within the downhole electronics 20 and uphole electronics 17 of FIG. 1 by the circuitry generally shown in FIG. 4. The signal from either one of the epithermal neutron detectors 14 or 15 is applied through an amplifier 25 and a pulse height discriminator 26 to a pair of counters 28 and 29. Counter 28 counts the number of epithermal neutrons detected during a first time interval $\Delta T1$ of the epithermal die-away interval $\Delta T$. Counter 29 counts the number of epithermal neutrons detected during a second time interval $\Delta T2$ of the epithermal die-away interval $\Delta T$. For example, assuming a burst of neutrons beginning at between t=0 and lasting for 5 microseconds, counter 28 would count neutrons during $\Delta T1$ of preferably from t=10 to t=15 microseconds and counter 29 would count neutrons during $\Delta T2$ of preferably from t=15 to t=20 microseconds. Counts from counters 28 and 29 are tramsmitted uphole to electronic 17 where a ratio signal of these two counts is provided by ratio calculator 30. This ratio signal is representative of the time resolution of the slope of the epithermal neutron reaction rate during the epithermal die-away spectrum. Function former 31 operates on the ratio signal to convert the measured ratio to true formation porosity based on a known relationship between such a ratio and true porosity. It is this true porosity derived from pulsed neutron logging that is plotted as the lithology independent porosity of FIG. 3. For further description of suitable circuitry useful in carrying out such an epithermal die-away measurement reference may be had to the aforementioned U.S. Pat. No. 4,097,737 to Mills, the teaching of which is incorporated herein by reference.

Figure 5:
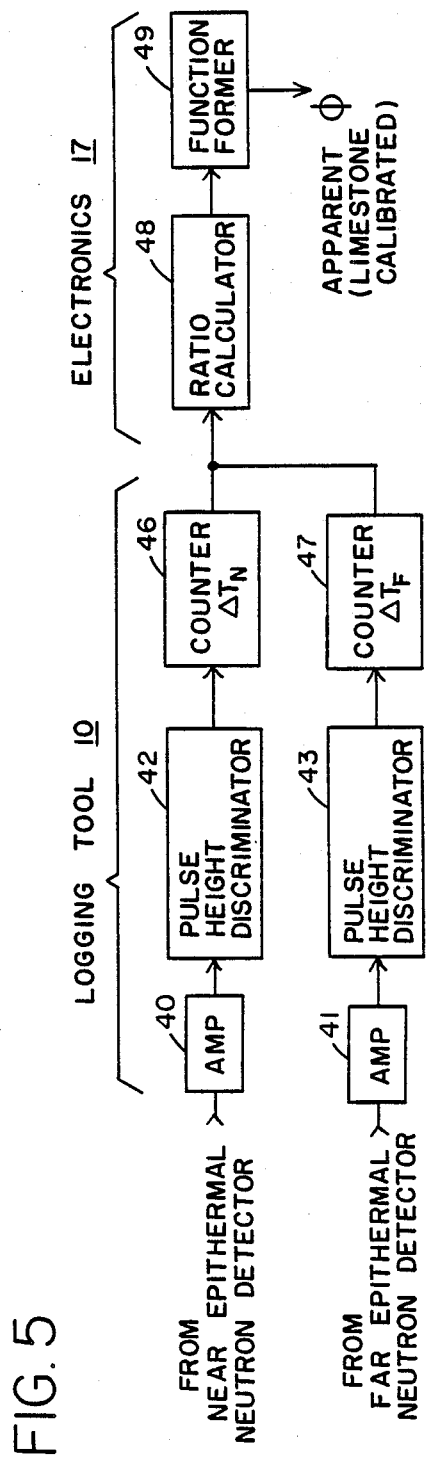
Figure 7:
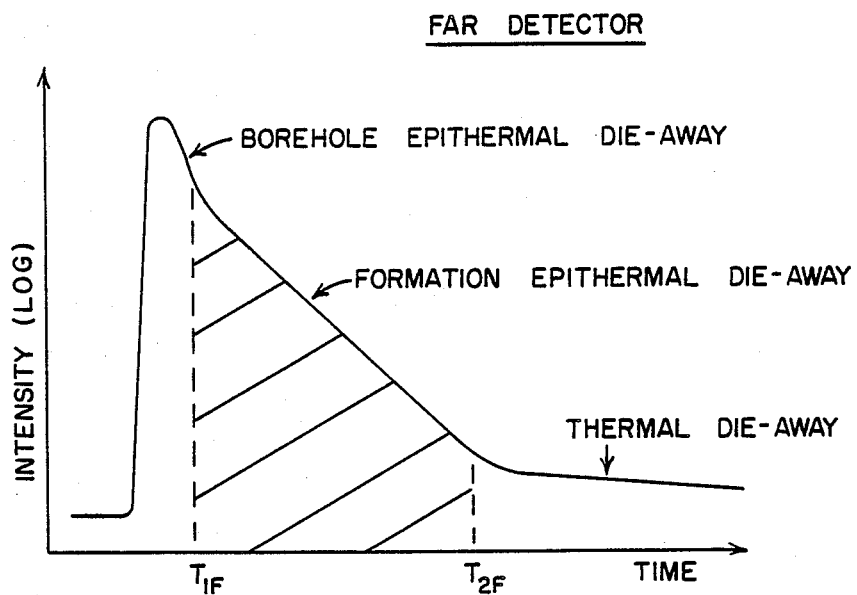
FIGS. 6 and 7 illustrate the time distributions of neutron counts from the rear and far detectors respectively of the pulsed neutron logging tool of FIG. 1.
Figure 6:
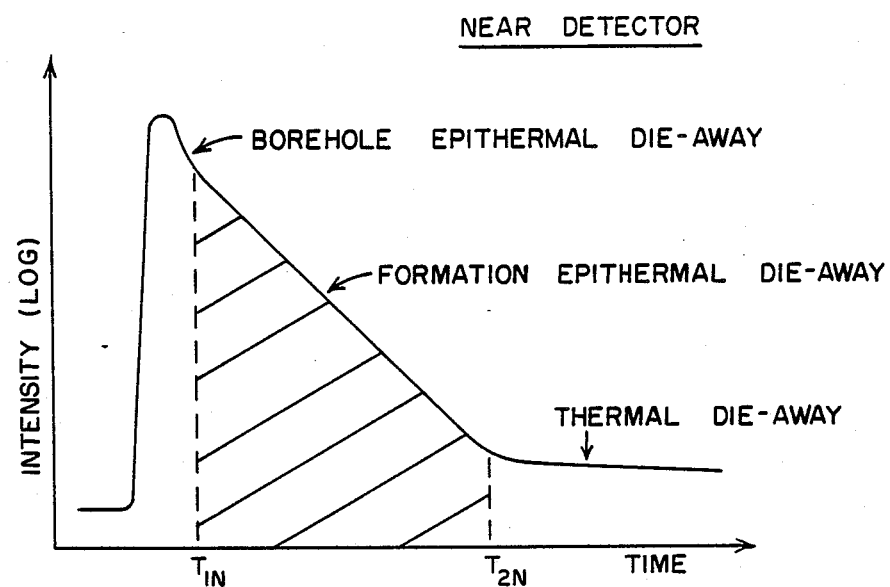

Referring now to the total epithermal neutron count measurement, this measurement is carried out by providing a count of the epithermal neutrons detected by the pair of spaced-apart detectors 14 and 15 during the time interval $\Delta T$ of the total epithermal die-away spectrum. This count is accomplished within the downhole electronics 20 and uphole electronics 17 of FIG. 1 by the circuitry generally shown in FIG. 5. The signals from the two detectors 14 and 15 are applied through amplifiers 40 and 41 respectively, and pulse height discriminators 42 and 43 respectively to counters 46 and 47 respectively. The total count from each of counters 46 and 47 over the epithermal die-away interval $\Delta T$ are transmitted uphole and applied to a ratio calculator 48. The ratio of these counts is applied of a function former 49 which operates on the ratio signal to convert the measured ratio to an apparent formation porosity based on a known relationship between such a ratio and apparent porosity for a logging tool calibrated in a limestone formation. In a preferred embodiment counters 46 and 47 function as time integrators to measure the total count from the near and far detectors 14 and 15 respectively during the formation epithermal die-away portion of the total die-away spectrum. More particularly, this portion of the total die-away spectrum attributable to the formation epithermal die-away occurs after borehole epithermal die-away has become negligible and before thermal die-away becomes significant. These three die-away components can be more readily seen by reference to FIGS. 6 and 7 which illustrate three-component die-away curves for the near and far detectors 14 and 15 respectively. From FIGS. 6 and 7 it can be seen that it is desirable to time integrate the die-away spectrum from both detectors to determine the hatched area under the die-away curve of FIG. 6 between times $T_{1N}$ and $T_{2N}$ for the near detector, and of FIG. 7 between times $T_{1F}$ and $T_{2F}$ for the far detector. Consequently, times $T_{1N}$ and $T_{2N}$ and times $T_{1F}$ and $T_{2F}$ define the time intervals $\Delta T_N$ and $\Delta T_F$ for integrating the neutron counts from the near and far detectors respectively as the measure of formation epithermal neutron die-away with negligible effect from borehole epithermal neutrons and from thermal neutrons.

In identifying these time intervals $\Delta T_N$ and $\Delta T_F$ it is generally difficult to establish the times $T_{1N}$, $T_{2N}$, $T_{1F}$ and $T_{2F}$ accurately for a three-component die-away spectrum wherein the times $T_{1N}$ and $T_{1F}$ occur at a portion of the die-away curve representing the effects from both the end of the borehole epithermal die-away period and the start of the formation epithermal die-away period and wherein the times $T_{2N}$ and $T_{2F}$ occur at a portion of the die-away curve representing the effects from both the end of the formation epithermal die-away period and the start of the thermal neutron die-away period. These times may be preselected by assuming that $T_{1N}$ and $T_{1F}$ have been delayed long enough for the borehole epithermal component to be at a negligible level and $T_{2N}$ and $T_{2F}$ are early enough that the thermal component is still negligible. However, the more preferable method is to analyze all three components simultaneously based on known model parameters to accurately select $T_{1N}$, $T_{2N}$, $T_{1F}$ and $T_{2F}$. Such an analysis for measurements $f_N$ and $f_F$ for the near and far detectors respectively is as follows:

$$f_N = \sum_{k=1}^{3} \alpha_{kN} e^{-\mu_{kN} t} \text{ and} \tag{1}$$

$$f_F = \sum_{k=1}^{3} a_{kF} e^{-\mu_{kF} t} \quad (2)$$

where:

α=measured neutron intensity (i.e. counts per unit time)
μ=time constant (i.e. inverse unit time)
t=time
k=subscripts of:
1 for borehole epithermal die-away component
2 for formation epithermal die-away component
3 for thermal die-away component
N=near detector
F=far detector It is now possible to integrate the area under the die-away curve for the time interval $\Delta T_N$ between $T_{1N}$ and $T_{2N}$ and for $\Delta T_F$ between $T_{1F}$ and $T_{2F}$ that includes only the formation component. For the near detector such a time integration gives a measure of the total formation epithermal neutron count as follows:

$$\int_0^\infty a_{2N} e^{-\mu_{2N} t} dt = a_N/\mu_{2N} \quad (3)$$

For the far detector such a time integration gives a measure of the total formation epithermal neutron count as follows:

$$\int_0^\infty a_{2F} e^{-\mu_{2F} t} dt = a_{2F}/\mu_{2F} \quad (4)$$

A ratio R can now be established in terms of the known model parameters from equations (3) and (4) as follows:

$$R = \frac{a_{2N}/\mu_{2N}}{a_{2F}/\mu_{2F}} \quad (5)$$

This ratio R is representative of the time integral of the formation epithermal neutron count from the formation epithermal neutron die-away component of the total die-away spectrum as measured by the near and far detectors. For a detailed description of a three-component die-away algorithm that may be employed in the pulsed neutron porosity logging method of the present invention to identify the model parameters α and μ for the formation epithermal neutron die-away component from the borehole epithermal and thermal neutron components reference may be made to copending U.S. application Ser. No. 192,444 filed May 11, 1988 for Mills et al, the teaching of which is incorporated herein by reference.

Ratio R is then converted to an apparent porosity based on a known relationship between such a ratio and apparent porosity derived from calibrating the logging tool in a limestone formation. It is this apparent porosity, derived from the pulsed neutron logging measurement of ratio R, that is plotted as the lithology dependent porosity of FIG. 3.

Having now described the method of the present invention in connection with specific embodiments thereof, it is to be understood that further modifications may now suggest themselves to those skilled in the art and it is intended to cover such modifications as fall within the scope of the appended claims.

What is claimed is:

1. A pulsed neutron porosity logging method comprising the steps of:
   (a) repetitively irradiating a subsurface formation with bursts of fast neutrons,
   (b) measuring the die-away rate of epithermal neutrons during a die-away spectrum for said epithermal neutrons within the irradiated subsurface formation substantially between each of said bursts of fast neutrons as a first measure of lithology independent porosity of said subsurface formation,
   (c) measuring a count of epithermal neutrons during a die-away spectrum for said epithermal neutrons within said irradiated subsurface formation between each of said bursts of fast neutrons as a second measure of lithology dependent porosity of subsurface formation, and
   (d) combining the measurements of epithermal neutron die-away rate and epithermal neutron count to provide an indication of subsurface formation lithology.

2. The method of claim 1 wherein:
   (a) said step of measuring the die-away rate of epithermal neutrons includes the step of time resolving said epithermal neutrons during said die-away spectrum, and
   (b) said step of measuring the count of epithermal neutrons includes the step of time integrating said epithermal neutrons during said die-away spectrum.

3. A pulsed neutron porosity logging method, comprising the steps of:
   (a) repetitively irradiating a subsurface formation with bursts of fast neutrons,
   (b) measuring the die-away rate of epithermal neutrons during a die-away spectrum for said epithermal neutrons within the irradiated subsurface formation between each of said bursts of fast neutrons,
   (c) measuring a count of epithermal neutrons during a die-away spectrum for said epithermal neutrons with said irradiated formation between each of said bursts of fast neutrons,
   (d) determining a lithology independent measurement of subsurface formation porosity from the measured die-away rate of epithermal neutrons, and
   (e) determining a lithology dependent measurement of subsurface formation porosity from the measured count of epithermal neutrons.

4. The method of claim 3 further including the step of combining said lithology independent and dependent measurements of subsurface formation porosity to provide a measure of subsurface formation lithology.

5. The method of claim 3 wherein
   (a) said step of measuring the die-away rate of epithermal neutrons includes the time resolution of said epithermal neutrons during a die-away spectrum of said epithermal neutrons, and
   (b) said step of measuring a count of epithermal neutrons includes the time integration of said epithermal neutrons during a die-away spectrum of said epithermal neutrons.

6. A pulsed neutron porosity logging method comprising the steps of:
   (a) repetitively irradiating a subsurface formation surrounding a borehole with bursts of fast neutrons from a pulsed neutron source positioned within said borehole, (b) detecting epithermal neutrons returning to said borehole with a pair of spaced-apart neutron detectors positioned within said borehole, (c) time resolving epithermal neutrons detected by at least one of said spaced-apart neutron detectors during a die-away spectrum of said epithermal neutrons as a lithology independent measure of the porosity of said subsurface formation, and (d) time integrating epithermal neutrons detected by both of said spaced-apart neutron detectors during said die-away spectrum of said epithermal neutrons as a lithology dependent measure of the porosity of said subsurface formation.

7. A pulsed neutron porosity logging method employing a pulsed source of fast neutrons and a pair of spaced-apart neutron detectors within a borehole logging tool calibrated within a formation of known lithology, comprising the steps of:

(a) repetitively irradiating the subsurface formation with bursts of fast neutrons spaced apart in time from said neutron source, (b) detecting epithermal neutrons returning to said pair of spaced-apart detectors between each burst of fast neutrons from said neutron source and resulting from the irradiation of said subsurface formation by said fast neutrons, (c) measuring the time resolution of the detected epithermal neutrons from at least one of said detectors during a die-away spectrum of said epithermal neutrons, (d) obtaining a lithology independent measurement of formation porosity from said time resolution measurement of epithermal neutrons, (e) measuring the time integration of the detected epithermal neutrons from both of said detectors during said die-away spectrum of said epithermal neutrons, (f) obtaining a lithology dependent measurement of formation porosity from the time integrated measurement of epithermal neutrons, and (g) combining said lithology independent and dependent measurements of porosity to provide an indication of formation lithology in accordance with a known relationship between said lithology independent and dependent measurements of porosity for the formation of known lithology in which the borehole logging tool was calibrated.

* * * * *